(12) United States Patent
Hart

(10) Patent No.: US 9,408,456 B2
(45) Date of Patent: Aug. 9, 2016

(54) UNIVERSAL MOBILE DEVICE HOLDER

(71) Applicant: John Kenison Hart, Leawood, KS (US)

(72) Inventor: John Kenison Hart, Leawood, KS (US)

(*) Notice: Subject to any disclaimer, the term of this patent is extended or adjusted under 35 U.S.C. 154(b) by 228 days.

(21) Appl. No.: 14/313,253

(22) Filed: Jun. 24, 2014

(65) Prior Publication Data

US 2015/0001265 A1  Jan. 1, 2015

Related U.S. Application Data

(60) Provisional application No. 61/840,293, filed on Jun. 27, 2013.

(51) Int. Cl.
*A45F 5/10* (2006.01)
*A45F 5/02* (2006.01)
*H04B 1/3827* (2015.01)

(52) U.S. Cl.
CPC ......... *A45F 5/021* (2013.01); *A45F 2200/0516* (2013.01); *H04B 2001/3855* (2013.01)

(58) Field of Classification Search
CPC .................................... A45F 5/02; A45F 5/10
See application file for complete search history.

(56) References Cited

U.S. PATENT DOCUMENTS

| | | |
|---|---|---|
| 1,240,527 A | 9/1917 | Allen |
| 2,150,709 A | 4/1938 | Bake |
| 2,618,419 A | 11/1952 | Vanish |
| 3,819,095 A | 6/1974 | Snyder |
| 4,136,805 A | 1/1979 | Storms |
| 4,223,864 A | 9/1980 | Harlow |
| 4,614,322 A | 9/1986 | Goetz |
| 4,953,771 A * | 9/1990 | Fischer .................. B60N 3/102 108/44 |
| 5,114,060 A * | 5/1992 | Boyer ........................ B62J 7/06 224/413 |
| 5,187,744 A * | 2/1993 | Richter .............. B60R 11/0241 224/553 |
| 5,305,381 A | 4/1994 | Wang |
| 5,375,749 A * | 12/1994 | Oliva ........................ A45F 5/02 224/242 |
| 5,457,745 A | 10/1995 | Wang |
| 5,551,079 A * | 8/1996 | Panther .................. H04B 1/086 340/7.63 |
| 5,903,645 A | 5/1999 | Tsay |
| 5,979,724 A * | 11/1999 | Loewenthal, Jr. ... B60R 11/0241 224/483 |
| 5,996,956 A * | 12/1999 | Shawver ............... G06F 1/1626 248/309.1 |
| 6,082,602 A | 7/2000 | Schwind |
| 6,085,113 A * | 7/2000 | Fan ..................... B60R 11/0241 379/426 |
| 6,427,959 B1 * | 8/2002 | Kalis ...................... H04M 1/04 248/288.11 |
| 6,665,524 B1 | 12/2003 | Niemann |
| 6,880,794 B1 | 4/2005 | Kahn |

(Continued)

FOREIGN PATENT DOCUMENTS

DE  202007004362  6/2007

*Primary Examiner* — Brian D Nash
(74) *Attorney, Agent, or Firm* — Erickson Kernell IP, LLC

(57) ABSTRACT

A universal belt clip for mobile devices. The belt clip includes two sets of hooks engaged on a top and a bottom edge of a mobile device. A body of the belt clip is extensible and selectively positionable to provide a tension force between the sets of clips and to retain the belt clip in engagement with the mobile device. The hooks are configured to receive mobile devices and cases thereon in a variety of thicknesses and the extensibility of the body is configured for adaptation to mobile devices of varied lengths. The hooks are pivotably coupled to the body to ease installation on the mobile device and to automatically adapt to a particular mobile device or case configuration.

20 Claims, 4 Drawing Sheets

(56) References Cited

U.S. PATENT DOCUMENTS

| | | | |
|---|---|---|---|
| 6,955,280 B2 * | 10/2005 | Saitoh | B60R 11/0241 224/197 |
| 6,969,398 B2 | 11/2005 | Stevens | |
| 7,158,092 B2 | 1/2007 | Shen | |
| 7,246,732 B1 * | 7/2007 | Ha | A63H 17/00 224/282 |
| 7,407,143 B1 | 8/2008 | Chen | |
| 7,418,097 B2 | 8/2008 | Chang | |
| 7,848,512 B2 | 12/2010 | Eldracher | |
| 8,027,464 B2 | 9/2011 | Piekarz | |
| 8,099,138 B2 | 1/2012 | Piekarz | |
| 2004/0069823 A1 | 4/2004 | Condiff | |
| 2004/0069824 A1 | 4/2004 | Condiff | |
| 2004/0251284 A1 * | 12/2004 | Pelligrini | A45F 5/02 224/198 |
| 2006/0215836 A1 | 9/2006 | Wang | |
| 2007/0056999 A1 | 3/2007 | Kahn | |
| 2007/0262223 A1 | 11/2007 | Wang | |
| 2010/0171021 A1 * | 7/2010 | Smith | A45C 13/30 248/558 |
| 2011/0031287 A1 * | 2/2011 | Le Gette | F16M 11/04 224/101 |
| 2011/0073608 A1 * | 3/2011 | Richardson | A45C 11/00 220/737 |
| 2011/0132950 A1 * | 6/2011 | Culver | B60R 11/0241 224/485 |
| 2011/0278885 A1 * | 11/2011 | Procter | B60R 11/0235 297/135 |
| 2012/0080465 A1 | 4/2012 | Son | |
| 2012/0298703 A1 | 11/2012 | Kriner | |

\* cited by examiner

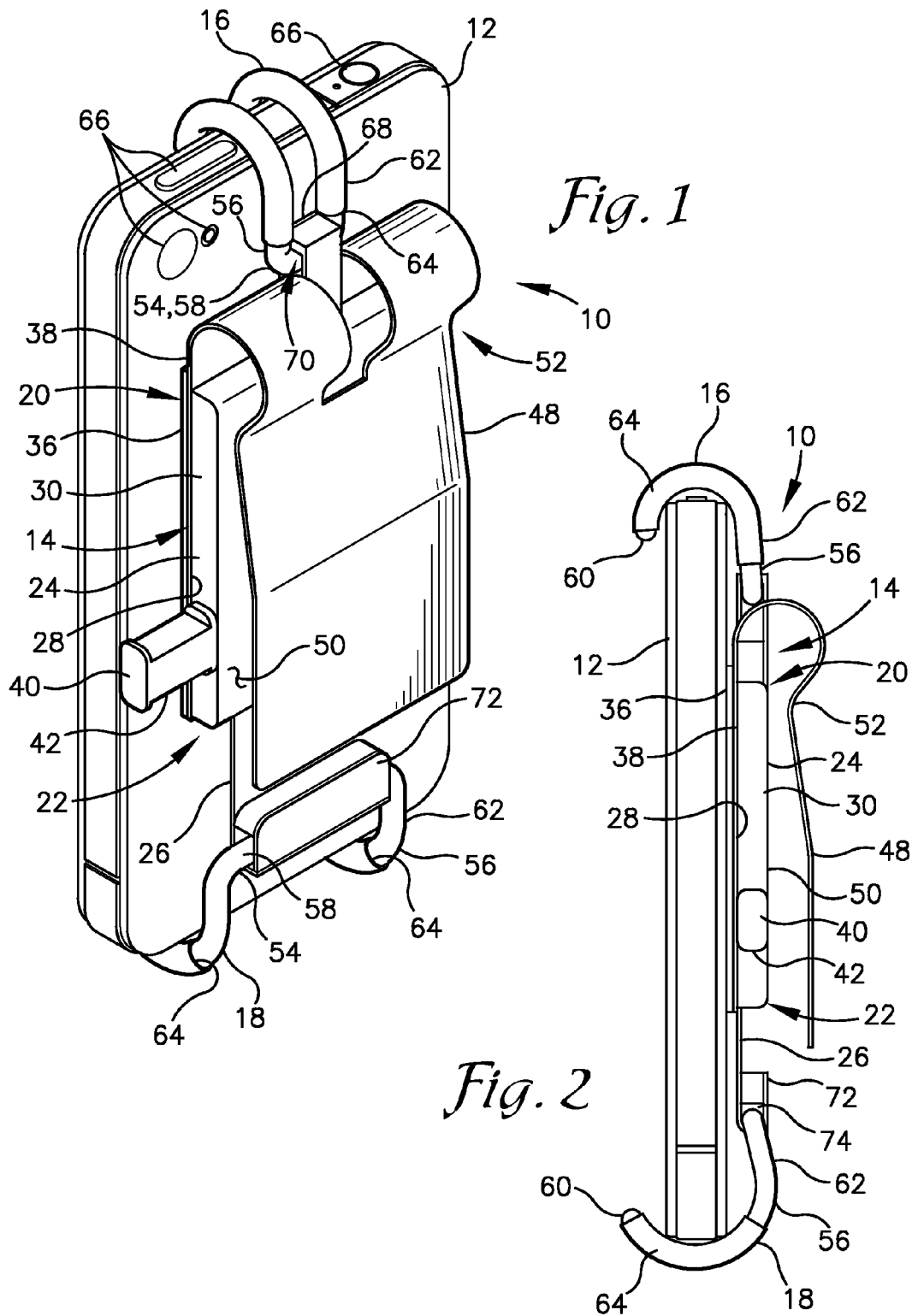

UNIVERSAL MOBILE DEVICE HOLDER

CROSS-REFERENCE TO RELATED APPLICATIONS

This application claims priority to U.S. Provisional Patent Application No. 61/840,293, filed Jun. 27, 2013, and titled UNIVERSAL CELL PHONE HOLDER, the disclosure of which is hereby incorporated herein in its entirety by reference.

BACKGROUND

Cases and holders for cell phones and other mobile devices are well known in the art. Nearly every such device has a corresponding holder that provides the user with benefits like protection from the elements and impacts such as that from dropping the phone. Holders may also include clips, clasps, or similar features that allow a user to easily carry the phone on their belt or attached to the side of a purse or bag. Cell phone and mobile device holders may also have aesthetically pleasing features.

Traditional cases and holders are extremely useful, yet they also have their deficiencies. One significant deficiency is that each different cell phone or mobile device requires a unique holder configured or adapted to cooperate with the particular dimensions, exterior shape, and arrangement of components on the particular device. Accordingly, users must purchase a new case or holder each time they change or upgrade their mobile device and for each such device that they own or use. This is an added expense and results in a collection of unuseable and/or unwanted cases and holders as each mobile device is replaced with a newer/different version.

There is a need in the art for a holder for mobile devices that is adaptable to a variety of different mobile devices. Such a holder that is adaptable to mobile devices of varied dimensions and surface configurations would be beneficial.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter. In brief, this disclosure describes, among other things, a mobile device holder designed to hold mobile devices of different lengths and thicknesses.

The mobile device holder can accommodate mobile devices with or without cases or skin coverings of a variety of sizes and dimensions. The holder incorporates hooks disposed to engage the top and bottom ends of the mobile device. The hooks are attached to a body via one or pivotable couplings. The hooks can be coated with various materials to provide an attractive appearance, frictional properties, and protection of the cell phone from abrasion or scratching by the hooks.

The body is expandable to accommodate mobile devices of varied lengths and is secured at a desired length by a ratcheting mechanism or similar means. The body also incorporates a belt clip for securing the holder to a user's belt, clothing, or the like. The body can be coated on surfaces that contact a mobile device disposed therein with a rubber, plastic, or similar material that decreases movement of the phone relative to the mobile device holder.

DESCRIPTION OF THE DRAWINGS

Illustrative embodiments of the invention are described in detail below with reference to the attached drawing figures, and wherein:

FIG. 1 is a perspective view of a mobile device holder coupled to a mobile device depicted in accordance with an embodiment of the invention;

FIG. 2 is a side elevational view of the mobile device holder of FIG. 1;

DETAILED DESCRIPTION

Figure 3:
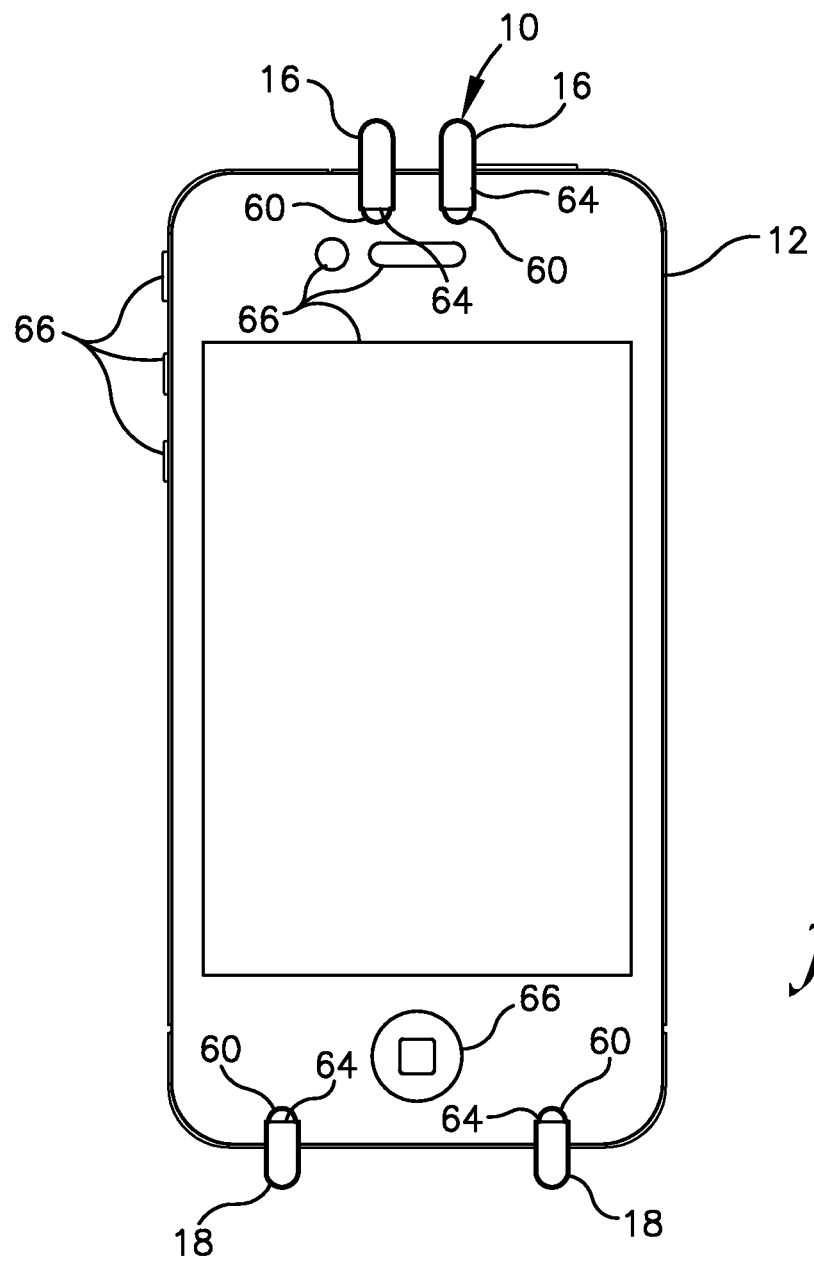
FIG. 3 is a front side view of the mobile device and mobile device holder of FIG. 1 depicting hooks of the mobile device holder extending around a top and a bottom end of the mobile device in accordance with an embodiment of the invention.
Figure 4:
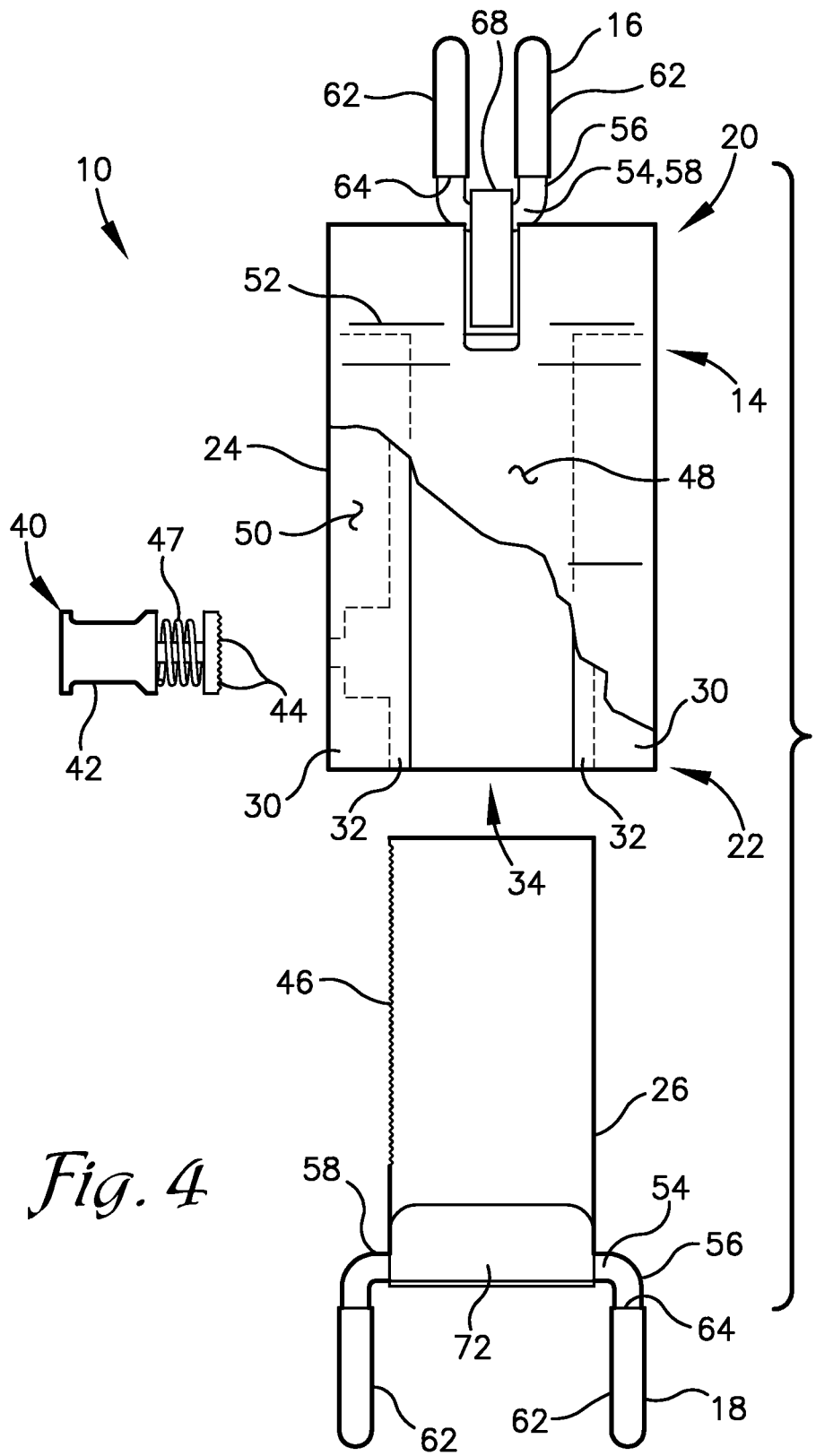
FIG. 4 is partially exploded view of the mobile device holder of FIG. 1 depicted with a portion of a belt clip partially removed.
Figure 5:
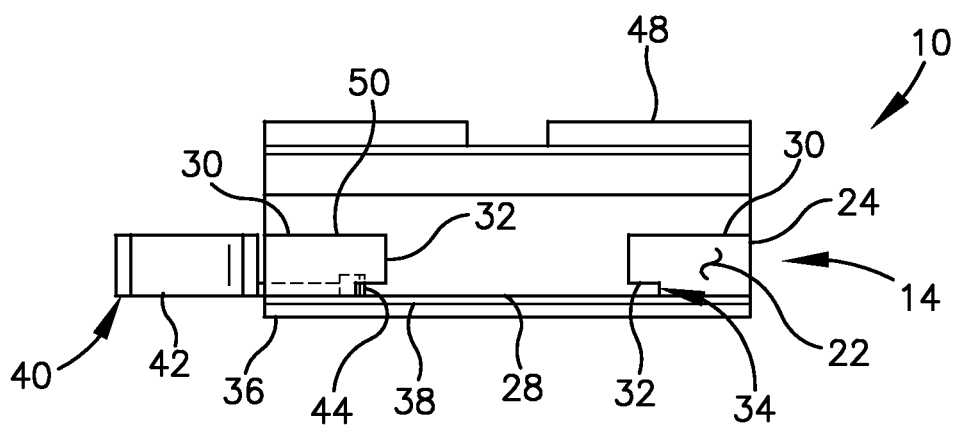
FIG. 5 is an elevational end-view of a body of the mobile device holder of FIG. 1.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

With reference to FIGS. 1-5, embodiments of the invention provide a mobile device holder 10 that is adaptable to hold a mobile device 12, such as a cell phone, smart phone, digital music player, personal data assistant, tablet computer, GPS unit, and the like, of varied lengths and/or thicknesses. For example, the holder 10 can be configured to couple to a mobile device 34 such as a cell phone or smart phone having a longitudinal dimension between approximately 115 mm and approximately 155 mm; such dimensions encompass a vast majority of currently available cell phones and smart phones. The holder 10 might also be configured to couple to somewhat larger mobile devices 34 such as tablet computers having dimensions between approximately 150 mm and approximately 300 mm. The holder 10 includes a body 14 with a pair of upper hooks 16 and a pair of lower hooks 18 extending from an upper end 20 and a lower end 22 thereof, respectively.

The body 10 comprises a base member 24 and a slide member 26. The base member 24 has a generally rectangular cuboidal form formed at least in part by an inner wall 28 and a pair of sidewalls 30. The sidewalls 30 are coupled to the inner wall 28 along opposite edges thereof. Each sidewall 30 includes a flange 32 that is spaced apart from the inner wall 28 and extends toward the opposite sidewall 30 to form a slot 34 or channel between the flanges 32 and the inner wall 28 that extends into the base member 24 from the lower end 22 thereof. The slot 34 is configured to slideably receive the slide member 26 therein such that the slide member 26 is slideable longitudinally relative to the base member 24 as described more fully below.

The base member 24 may include a pad 36 disposed on a contact surface 38 of the base member 24, e.g. on a surface of the inner wall 28 nearest the mobile device 12 to which the holder 10 is coupled. The pad 36 comprises one or more materials configured to increase frictional engagement between the contact surface 38 and the mobile device 12. The pad 36 may also aid to prevent or resist scratching or abrasion of the mobile device 12. For example, the pad 36 may comprise one or more of foam rubber, rubber, plastic, nylon, or the like.

A ratcheting stud 40 is disposed in one of the sidewalls 30 to extend at least partially through the sidewall 30 and into the slot 34. A first end of the stud 40 extends externally to the base member 24 a distance sufficient to form a tab 42 that can be grasped by a user. The tab 42 is preferably configured for grasping by hand but may be graspable or engageable by one or more common or specialty tools. An opposite second end of the stud 40 extends at least partially into the slot 34. The second end is provided with one or more teeth 44, ridges, or similar features that are configured to engage mating teeth or engagement features of a rack 46 disposed along an edge of the slide member 26, as described more fully below. The ratcheting stud 40 is biased to extend into the slot 34 by one or more leaf or coil springs 47 or similar biasing element disposed interior to the sidewall 30.

The base member 24 provides a clip flange 48 that depends from an upper end and extends toward a lower end of the base member 24 to at least partially overlie an outer surface 50 of the base member 24. Alternatively, in some embodiments the clip flange 48 depends from one sidewall 30 and extends toward the other sidewall 30 to thereby provide a horizontal orientation to the holder 10. The clip flange 48 is preferably spaced apart from the outer surface 50 of the base member 24 to allow insertion of an article, such as a belt, waist band, or the like therebetween. In another embodiment, at least a portion of the clip flange 48 extends into contact with the outer surface 50. The clip flange 48 is substantially resilient to enable flexure thereof without causing permanent deformation when an article is disposed between the clip flange 48 and the outer surface 50 of the base member 24. One or more undulations 52, ribs, surface features, textures, coatings, or the like can be provided in the clip flange 48 or on an underside 35 thereof to increase friction between the clip flange 48 and an article disposed between the clip flange 48 and the base member 24. In another embodiment, the clip flange 48 is removeably coupled to the base member 24.

The slide member 26 is a plate or similar element that is dimensioned to fit within the slot 34, e.g. the slide member 26 has a width that is just less that the distance between the sidewalls 30 and a thickness just less than the distance between the inner wall 28 and the flanges 32 of the sidewalls 30. An edge of the slide member 26 adjacent to the sidewall 30 through which the ratcheting stud 40 extends includes the rack 46 disposed therealong. The teeth or features of the rack 46 are configured to displace the ratcheting stud 40 outwardly from the base member 24 and to slide thereby as the slide member 26 is moved into the slot 34 in a first direction but to engage the teeth 44 on the stud 40 when moved in an opposite second direction to prevent or resist withdrawal of the slide member 26 from the slot 34. The ratcheting stud 40 can be withdrawn from the slot 34 by pulling on the tab 42 to disengage the teeth 44 on the stud 40 from the rack 46 on the slide member 26 to enable sliding movement of the slide member 26 relative to the base member 24. When released, the bias on the stud 40 again moves the stud 40 toward the slide member 26 to reengage the teeth 44 with the rack 46. It is understood that a variety of configurations of ratcheting engagements may be employed in embodiments of the invention—such configurations are within the scope of embodiments described herein.

The upper and lower hooks 16, 18 are provided in pairs that are joined together by one or more transverse support members 54 that maintain their spacing and relative orientations. In some embodiments, the hooks 16, 18 can be independent from one another. As depicted in FIGS. 1-4, the upper hooks 16 are preferably constructed from opposite ends of a single rod-like member 56. The transverse support member 54 is provided by a generally linear central portion 58 of the member 56, and the hooks 16 are formed from end portions of the member 56 that are bent to extend generally perpendicularly to transverse support member 54 and further formed to follow a generally arcuate or hooked path. The lower hooks 18 are similarly formed, but the transverse support member 54 therebetween and/or the hooks 18 may have different dimensions than those of the upper hooks 16. Although a preferable configuration of the hooks 16, 18 and the transverse support member 54 is described herein, one of skill in the art will recognize a variety of other configurations that can be employed to provide the functions described herein without departing from the scope of embodiments of the invention.

The hooks 16, 18 can have any desired profile that includes a distance between a point 60 and shank 62 thereof that is sufficient to receive at least a desired maximum thickness of the mobile device 12 and/or protective case or skin thereon, as depicted in FIGS. 1-3. The hooks 16, 18 are preferably configured to receive an edge of a mobile device 12 or an edge of a case disposed on the mobile device 34 that is between about 4 mm and about 17 mm, or more preferably between about 7 mm and about 12 mm. In one embodiment, the hooks 16, 18 are configured to cause at least a portion of the shank thereof to be pressed against a backside of the mobile device 12 when a tension force is applied between the upper hooks 16 and the lower hooks 18. The contact between the shank 62 of the hooks 16, 18 and the mobile device 12 may provide additional stabilization of the hooks 16, 18 on the mobile device 12.

The hooks 16, 18 can be constructed of any desired materials or combinations thereof. The hooks 16, 18 may be at least partially resilient to allow some flexure thereof without resulting in permanent bending. The hooks 16, 18 might be made from one or more of aluminum, steel, spring steel, plastic, nylon, or the like and can include a coating 64 comprised of softer, frictional materials like rubbers, plastics, or the like.

The spacing and orientation of the hooks 16 with respect to one another is configured to avoid obstruction of components 66 like cameras, sensors, lights, microphones, data ports, charging ports, hard buttons, and the like that may be provided on the mobile device 12. This configuration can be specific to a particular mobile device 12 but preferably is suitable for use with a variety of different mobile devices 12. The body 14 may also include one or more features or cutouts that are configured to avoid obstruction of such items.

The pairs of upper and lower hooks 16, 18 are pivotably coupled to the base member 24 and the slide member 26 respectively. The base member 24 includes a projection 68 extending from the upper end 20 thereof that forms a first transverse passageway 70 in which the transverse support member 54 between the upper hooks 16 is captured. The transverse support member 54 is freely pivotable about an axis extending parallel to the passageway 70 to allow pivoting of the upper hooks 16 relative to the base member 24. The slide member 26 similarly includes a coupling block 72 disposed at a lower end thereof that forms a second transverse passageway 74. The transverse support member 54 between the lower hooks 18 is disposed in and is freely pivotable within the second transverse passageway 74.

In another embodiment, the hooks 16, 18 are secured to the base member 24 and the slide member 26 by one or more flexible, non-extensible cables (not shown). The cables comprise any wire, cable, thread, or similar component and may be coated with one or more materials. For example, the wires can comprise stainless steel braided cables. The hooks 16, 18 can be coupled directly to the cables such as by welding or can employ one or more fasteners. Opposite ends of the cables are similarly coupled to the base member 24 and slide member 26, respectively.

With continued reference to FIGS. 1-5, operation of the holder 10 is described in accordance with an embodiment of the invention. Initially, the holder 10 not coupled to the mobile device 12. The tab 42 is grasped and pulled away from the base member 24 to withdraw the teeth 44 on the ratcheting stud 40 from engagement with the rack 46 on the slide member 26. The slide member 26 can thus be moved relative to the base member 24 to expand the body 14 and the distance between the upper hooks 16 and the lower hooks 18.

An upper end of the mobile device 12 is inserted into the upper hooks 16, e.g. between the points 60 and the shanks 62 thereof. The pivotable coupling of the hooks 16 relative to the base member 24 may provide flexibility between the hooks 16 and the body 14 to ease engagement of the mobile device 12 with the hooks 16. The ability of the hooks 16 to pivot relative to the base member 24 also aids adaptation of the holder 10 to mobile devices 12 of varied thicknesses or to cases thereon having a variety of thicknesses. The hooks 16 are enabled to automatically pivot to an orientation relative to the base member 24 that is most suitable for coupling to the particular mobile device 12.

The lower hooks 18 are similarly engaged with a lower end of the mobile device 12 and the slide member 26 is inserted into the slot 34. A force is applied to the slide member 26 to slideably move the slide member 26 into the slot 34 and toward the upper end 20 of the base member 24. The teeth of the rack 46 on the slide member 26 contact the teeth 44 on the ratcheting stud 40 and displace the stud 40 outwardly from the slot 34 to allow the slide member 26 to slide thereby and into the slot 34. The movement of the slide member 26 into the slot 34 continues until a desired tension force is formed between the upper hooks 16 and the lower hooks 18. The tension force is preferably sufficient to maintain the holder 10 in engagement with the mobile device 12. Upon release of the applied force, the teeth 44 engage the teeth of the rack 46 to prevent or substantially resist withdrawal of the slide member 26 from the slot 34 and to retain the tension force generated between the upper and lower hooks 16, 18.

As the tension force is applied, the upper and the lower hooks 16, 18 may at least partially pivot about their respective couplings to automatically adapt to the shape of the edges of the mobile device 12 or a case disposed thereon. For example, a mobile device 12 or case that has edges that are generally square may cause the hooks 16, 18 to take a more linear alignment in which the shanks 62 are parallel or nearly parallel to the plane of the base member 24. On a mobile device 12 or case with a sharp or thinner edge or an edge that is rounded toward a front of the mobile device 12, the hooks 16, 18 may take a more rearwardly pivoted orientation in which the shanks 62 of the hooks 16, 18 lean rearwardly away from the mobile device 12.

In the installed condition, the pad 36 on the inner wall 28 of the base member 24 is pressed into contact with a surface of the mobile device 12. The pad 36 may be at least partially compressed against the surface of the mobile device 12. Thereby, the pad 36 provides additional friction between the holder 10 and the mobile device 12 to resist movement of the holder 10 relative to the mobile device 12. And the pad 36 prevents or resists damaging the surface of the mobile device 12 by the holder 10 during handling and use by a user.

The holder 10 with cell phone 12 engaged therein can be placed on a user's belt, clothing, or other article using the clip flange 48. The holder 10 can be removed from the mobile device 12 by withdrawing the ratcheting stud 40 from the slot 34 via the tab 42. Such withdrawal disengages the teeth 44 on the stud 40 from the rack 46 on the slide member 46 and allows the slide member 26 to move relative to the base member 24.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to demarcate those structures as including a plurality of possible arrangements or designs within the scope of this disclosure and readily identifiable by one of skill in the art to perform the particular function in a similar way without specifically listing all such arrangements or designs. Certain features and sub-combinations are of utility and may be employed without reference to other features and sub-combinations and are contemplated within the scope of the claims.

What is claimed is:

1. A holder for mobile devices comprising:
    a base member having a slot extending into a first end thereof;
    a slide member including a projection that is engaged with the slot and that is selectively positionable within the slot;
    a first hook pivotably coupled to a second end of the base member, the second end being opposite the first end, the first hook having a first point and a first shank, the first point and the first shank being spaced apart to receive an edge of a mobile device therebetween; and
    a second hook pivotably coupled to the slide member and having a second point and a second shank, the second point and the second shank being spaced apart to receive an opposite edge of the mobile device therebetween.

2. The holder for mobile devices of claim 1, further comprising:
    a clip flange extending from the base member and configured to receive at least a portion of a garment of a user between the clip flange and the base member to couple the holder to the garment.

3. The holder for mobile devices of claim 1, wherein the engagement of the slide member with the slot provides a tension force between the first hook and the second hook.

4. The holder for mobile devices of claim 1, wherein the first hook and the second hook are at least partially resilient.

5. The holder for mobile devices of claim 1, wherein the slide member includes a series of engagement features along an edge thereof, and further comprising:

a ratcheting stud extending into the slot and being biased into contact with at least one of the series of engagement features of the slide member.

6. The holder for mobile device of claim 5, wherein the ratcheting stud allows travel of the slide member in a first direction and engages the at least one of the series of engagement features to resist movement of the slide member in an opposite second direction.

7. The holder for mobile devices of claim 5, wherein the base member includes a sidewall forming at least a portion of the slot and wherein the ratcheting stud extends through the sidewall and includes a first end that is graspable by a user to withdraw the ratcheting stud from engagement with the at least one of the series of engagement features of the slide member.

8. The holder for mobile devices of claim 1, wherein the base member includes a pad disposed on a surface thereof so as to be positioned between the base member and a mobile device to which the holder is coupled, the pad increasing frictional forces between the holder and the mobile device.

9. The holder for mobile devices of claim 1, wherein the distance between the first point and the first shank of the first hook is sufficient to receive a first edge of a case disposed on the mobile device and the distance between the second point and the second shank of the second hook is sufficient to receive an opposite second edge of the case.

10. The holder for mobile devices of claim 1, further comprising:
a third hook configured like the first hook, arranged as a first pair with the first hook, and spaced laterally apart from the first hook by a first transverse support member; and
a fourth hook configured like the second hook, arranged as a second pair with the second hook, and spaced laterally apart from the second hook by a first transverse support member.

11. The holder for mobile devices of claim 1, wherein a distance between the first hook and the second hook is selectively adjustable via the selective positioning of the projection of the slide member in the slot.

12. A holder for mobile devices comprising:
a base member having a slot extending longitudinally into a first end thereof;
a slide member including a projection that is engaged with the slot and that is selectively positionable within the slot;
a first pair of laterally spaced apart hooks pivotably coupled to a second end of the base member, the second end being opposite the first end, the first pair of hooks engaging a first edge of a mobile device; and
a second set of laterally spaced apart hooks pivotably coupled to the slide member and engaging an opposite edge of the mobile device therebetween, the slide member being selectively positioned within the slot to provide a tension force between the first set of hooks and the second set of hooks.

13. The holder for mobile devices of claim 12, further comprising:
a clip flange extending from the base member and configured to receive at least a portion of a garment of a user between the clip flange and the base member to couple the holder to the garment.

14. The holder for mobile devices of claim 12, wherein the hooks of the first pair and the second pair pivot relative to the base member and the slide member respectively to automatically adapt to a shape of the mobile device as the tension force is applied.

15. The holder for mobile devices of claim 12, wherein the slide member includes a series of engagement features along an edge thereof, and further comprising:
a ratcheting stud extending into the slot and being biased into contact with at least one of the series of engagement features of the slide member, the ratcheting stud allowing travel of the slide member in a first direction to apply the tension force and engaging the at least one of the series of engagement features to resist movement of the slide member in an opposite second direction and maintain the tension force.

16. The holder for mobile devices of claim 12, wherein the base member includes a pad disposed on a surface thereof and positioned between the base member and the mobile device to which the holder is coupled, the pad increasing frictional forces between the holder and the mobile device.

17. A belt clip coupleable to mobile devices of varied lengths and thicknesses, the belt clip comprising:
a first pair of laterally spaced apart hooks engaged with a first edge of a mobile device;
a second set of laterally spaced apart hooks engaged with a second edge of the mobile device, the second edge being opposite the first edge;
a base member having a slot extending longitudinally into a first end thereof, the first pair of hooks being pivotably coupled to a second end of the base member, the second end being opposite the first end;
a slide member including a projection that is engaged with the slot, the second set of laterally spaced apart hooks being pivotably coupled to the slide member, the slide member being selectively positionable within the slot to adjust a distance between the first pair of hooks and the second pair of hooks and to provide a tension force between the first pair of hooks and the second pair of hooks; and
a clip flange extending from the base member and configured to receive at least a portion of a garment of a user between the clip flange and the base member to couple the holder to the garment.

18. The belt clip of claim 17, wherein the base member includes a pad disposed on a surface thereof and positioned between the base member and the mobile device, the pad increasing frictional forces between the holder and the mobile device.

19. The belt clip of claim 17, wherein the hooks of the first pair of hooks and the second pair of hooks each include a point and a shank, and wherein the distance between the point and the shank is between approximately 4 mm and approximately 17 mm.

20. The belt clip of claim 17, wherein mobile device has a longitudinal dimension between about 115 mm and about 155 mm and the slide member is selectively positionable within the slot to provide a distance between the first pair of hooks and the second pair of hooks sufficient to receive the mobile device therebetween.

* * * * *